US010681765B2

(12) United States Patent
Brahmi et al.

(10) Patent No.: US 10,681,765 B2
(45) Date of Patent: *Jun. 9, 2020

(54) CONTROLLING VEHICLE-TO-VEHICLE COMMUNICATION USING A DISTRIBUTION SCHEME

(71) Applicant: Telefonaktiebolaget LM Ericsson (publ), Stockholm (SE)

(72) Inventors: Nadia Brahmi, Aachen (DE); Joachim Sachs, Sollentuna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/967,989

(22) Filed: May 1, 2018

(65) Prior Publication Data

US 2018/0249525 A1 Aug. 30, 2018

Related U.S. Application Data

(63) Continuation of application No. 14/897,835, filed as application No. PCT/EP2013/062299 on Jun. 13, 2013, now Pat. No. 9,992,809.

(51) Int. Cl.
*H04W 4/00* (2018.01)
*H04W 76/18* (2018.01)
(Continued)

(52) U.S. Cl.
CPC ............ *H04W 76/18* (2018.02); *G08G 1/161* (2013.01); *H04W 4/40* (2018.02); *H04W 4/46* (2018.02);
(Continued)

(58) Field of Classification Search
CPC ....... H04W 76/18; H04W 4/40; H04W 76/16; H04W 28/0268; H04W 28/021;
(Continued)

(56) References Cited

U.S. PATENT DOCUMENTS 8,089,855 B2    1/2012  Agrawal et al.
8,457,555 B2    6/2013  Morrissey et al.
(Continued)

FOREIGN PATENT DOCUMENTS

CN    102860071 A    1/2013
WO    2014173429 A1  10/2014

OTHER PUBLICATIONS

Shafiee, K., et al., "Optimal Distributed Vertical Handoff Strategies in Vehicular Heterogeneous Networks", IEEE Journal on Selected Areas in Communications, IEEE Service Center, Piscataway, NJ, US, vol. 29, No. 3, Mar. 1, 2011, pp. 534-544, XP011348543.
(Continued)

*Primary Examiner* — Chuong T Ho
(74) *Attorney, Agent, or Firm* — Rothwell, Figg, Ernst & Manbeck, P.C.

(57) ABSTRACT

A method for controlling vehicle-to-vehicle communication is described. The vehicle-to-vehicle communication is performable using a first radio technology for performing the vehicle-to-vehicle communication and a second radio technology for accessing a cellular network. The method comprises determining a distribution scheme for distributing a transmission of vehicle-to-vehicle communication messages among the first radio technology and the second radio technology, and, in accordance with the determined distribution scheme, a vehicle-to-vehicle communication device controlling the transmission of the vehicle-to-vehicle communication messages. Therefore the vehicle-to-vehicle communication can be easily and efficiently controlled and the accordingly controlled vehicle-to-vehicle communication can be performed in an easy, efficient, cost-effective and reliable way.

27 Claims, 6 Drawing Sheets

(51) Int. Cl.
    *H04W 4/46*     (2018.01)
    *H04W 28/02*     (2009.01)
    *H04W 76/16*     (2018.01)
    *G08G 1/16*     (2006.01)
    *H04W 4/40*     (2018.01)
    *H04W 88/06*     (2009.01)
    *H04W 92/18*     (2009.01)

(52) U.S. Cl.
    CPC ..... *H04W 28/021* (2013.01); *H04W 28/0268* (2013.01); *H04W 76/16* (2018.02); *H04W 88/06* (2013.01); *H04W 92/18* (2013.01)

(58) Field of Classification Search
    CPC ..... H04W 4/046; H04W 92/18; H04W 88/06; G08G 1/161
    USPC .................. 370/329, 330, 252, 254
    See application file for complete search history.

(56) References Cited

U.S. PATENT DOCUMENTS

| | | | |
|---|---|---|---|
| 9,620,143 B2 | 4/2017 | Tanaka | |
| 9,992,809 B2* | 6/2018 | Brahmi | H04W 28/021 |
| 2009/0103452 A1* | 4/2009 | Horvath | H04B 7/18506 370/254 |
| 2010/0081446 A1 | 4/2010 | Ushiki | |
| 2010/0234071 A1 | 9/2010 | Shabtay et al. | |
| 2011/0095905 A1 | 4/2011 | Mase | |
| 2011/0238935 A1 | 9/2011 | Meehan | |
| 2012/0026877 A1* | 2/2012 | Rajappan | H04L 47/724 370/235 |
| 2012/0182935 A1 | 7/2012 | Addepalli et al. | |
| 2012/0314615 A1 | 12/2012 | Nagai et al. | |
| 2013/0201847 A1* | 8/2013 | Chincholi | H04W 28/08 370/252 |
| 2013/0279491 A1* | 10/2013 | Rubin | G08G 1/166 370/347 |
| 2013/0301584 A1 | 11/2013 | Addepalli et al. | |
| 2014/0005859 A1* | 1/2014 | Baskin | G07C 9/00309 701/2 |
| 2014/0128072 A1* | 5/2014 | Yi | H04W 48/18 455/435.3 |
| 2014/0269604 A1 | 9/2014 | Kamiya et al. | |
| 2014/0315565 A1* | 10/2014 | Ihara | H04W 16/14 455/452.1 |
| 2014/0323133 A1 | 10/2014 | Yeh et al. | |
| 2015/0296411 A1 | 10/2015 | Meyer et al. | |

OTHER PUBLICATIONS

Toor, Y., et al., "Vehicle Ad Hoc Networks: Applications and Related Technical Issues" IEEE Communications Surveys, IEEE, New York, NY, US, vol. 10, No. 3, Jul. 1, 2008, pp. 74-88, XP011234563.

Sichere Intelligente Mobilitat, simTD, Deliverable D21.2, Konsolidierter Systemarchitekturentwurf, Version 3.0, Sep. 10, 2009, 232 pages.

IEEE Standard for Information technology—Telecommunications and Information exchange between systems—Local and metropolitan area networks—Specific requirements, Part 11: Wireless LAN Medium Access Control (MAC) and Physical Layer (PHY) Specifications, Amendment 6: Wireless Access in Vehicular Environments, 2010, 51 pages.

Sichere Intelligente Mobilitat, simTD, Deliverable D21.4, Spezifikation der Kommunikationsprotokolle, Version 1.0, Sep. 29, 2009, 150 pages.

International Search Report and Written Opinion issued in PCT/EP2013/062299 (dated Apr. 2, 2014), 14 pages.

Vehicular Communication Systems: Enabling Technologies, Applications, and Future Outlook on Intelligent Transportation, Nov. 2009.

Chinese Office Action issued in Application No. 201380078815.5 dated May 31, 2018, 13 pages.

\* cited by examiner

CONTROLLING VEHICLE-TO-VEHICLE COMMUNICATION USING A DISTRIBUTION SCHEME

CROSS-REFERENCE TO RELATED APPLICATIONS

This application is a continuation of U.S. application Ser. No. 14/897,835, having a section 371 date of Dec. 11, 2015 (published as US 20160242223), which is the national stage of international application no. PCT/EP2013/062299, filed on Jun. 13, 2013. The above identified applications and publication are incorporated by this reference.

TECHNICAL FIELD

The present invention relates to controlling vehicle-to-vehicle communication and to corresponding methods, devices, nodes, entities, computer programs and a corresponding communication system.

BACKGROUND

In vehicular transport and traffic management, intelligent transport system (ITS) applications are used for supporting drivers. Thereby, traffic safety can be improved by providing the drivers with information allowing for making smarter decisions in the traffic. Such ITS applications may involve transmitting information between different vehicles, for example in the form of a Cooperative Awareness Message (CAM). The information may be used for providing a warning or guidance to the driver, for example in the form of an emergency vehicle warning, an intersection collision warning, a slow vehicle warning, or a motorcycle approaching indication. The information may be transmitted using a radio technology for vehicle-to-vehicle (V2V) communication, for example as specified by an IEEE 802.11p standard, also referred to as Wireless Access in Vehicular Environments (WAVE). According to the IEEE 802.11p standard, a wireless ad-hoc network may be formed between different vehicles.

CAMs are messages which are usually periodically broadcasted by a vehicle to inform further vehicles in the surrounding about the current status of the transmitting vehicle. CAMs may, for example, be used for transmitting information such as the current geographical position, speed, and/or basic attributes of the vehicle. A vehicle may receive one or more CAMs from other vehicles and may utilize the information provided in the one or more CAMs for supporting its driver, for example by providing a warning or other guidance.

It is also envisioned to use a radio technology usually being used for accessing a cellular network, for example Long-Term Evolution (LTE) or High-Speed Packet Access (HSPA), in order to transmit the above described information.

SUMMARY

It is an object of the present invention to provide measures with which a V2V communication can be easily and efficiently controlled and the accordingly controlled V2V communication can be performed in an easy, efficient, cost-effective and reliable way. It is also an object of the present invention to provide corresponding methods, devices, nodes, entities, computer programs and a corresponding communication system.

Methods, a V2V communication device, a node, an entity, a communication system, and computer programs according to the independent claims are provided.

According to an exemplary aspect of the invention, a method for controlling V2V communication is provided. The V2V communication is performable using a first radio technology for performing the V2V communication and a second radio technology for accessing a cellular network. The method comprises determining a distribution scheme for distributing a transmission of V2V communication messages among the first radio technology and the second radio technology, and, in accordance with the determined distribution scheme, a V2V communication device controlling the transmission of the V2V communication messages.

According to another exemplary aspect of the invention, a method for controlling V2V communication is provided. The V2V communication is performable using a first radio technology for performing the V2V communication and a second radio technology for accessing a cellular network. The method is performed by a V2V communication device and comprises controlling a transmission of V2V communication messages in accordance with a determined distribution scheme for distributing a transmission of the V2V messages among the first radio technology and the second radio technology.

According to another exemplary aspect of the invention, a V2V communication device for controlling V2V communication is provided. The V2V communication is performable using a first radio technology for performing the V2V communication and a second radio technology for accessing a cellular network. The V2V communication device is adapted to control a transmission of V2V communication messages in accordance with a determined distribution scheme for distributing a transmission of the V2V messages among the first radio technology and the second radio technology.

According to another exemplary aspect of the invention, a method usable in association with controlling V2V communication is provided. The V2V communication is performable using a first radio technology for performing the V2V communication and a second radio technology for accessing a cellular network. The method is performed by a node of the cellular network and comprises determining a distribution scheme for distributing a transmission of V2V communication messages among the first radio technology and the second radio technology. The method comprises transmitting the determined distribution scheme to a V2V communication device.

According to another exemplary aspect of the invention, a node for a cellular network and being usable in association with controlling V2V communication is provided. The V2V communication is performable using a first radio technology for performing the V2V communication and a second radio technology for accessing the cellular network. The node is adapted to determine a distribution scheme for distributing a transmission of V2V communication messages among the first radio technology and the second radio technology, and to transmit the determined distribution scheme to a V2V communication device.

According to another exemplary aspect of the invention, a method usable in association with controlling V2V communication is provided. The V2V communication is performable using a first radio technology for performing the V2V communication and a second radio technology for accessing a cellular network. The method is performed by an entity and comprises transmitting information impacting a determination of a distribution scheme for distributing a transmission of V2V communication messages among the first radio technology and the second radio technology to a further entity, particularly a V2V communication device adapted to determine the distribution scheme or a node of the cellular network adapted to determine the distribution scheme.

According to another exemplary aspect of the invention, an entity being usable in association with controlling V2V communication is provided. The V2V communication is performable using a first radio technology for performing the V2V communication and a second radio technology for accessing the cellular network. The entity is adapted to transmit information impacting a determination of a distribution scheme for distributing a transmission of V2V communication messages among the first radio technology and the second radio technology to a further entity, particularly a V2V communication device adapted to determine the distribution scheme or a node of the cellular network adapted to determine the distribution scheme.

According to another exemplary aspect of the invention, a communication system for controlling a vehicle to vehicle communication is provided. The communication system comprises a V2V communication device described above, and at least one of a node described above and an entity described above.

According to another exemplary aspect of the invention, a computer program is provided. The computer program, when being executed by at least one processor, causes a method described above to be performed.

According to another exemplary aspect of the invention, a computer program product is provided. The computer program product comprises program code to be executed by at least one processor. Thereby a method described above is caused to be performed.

Further embodiments are described in the dependent claims.

DETAILED DESCRIPTION OF EMBODIMENTS

It is noted that similar or identical elements or steps in the Figures are referenced by the same reference numeral or by reference numerals which are only different within the first digit. Dashed elements in the Figures denote optional features.

In the following, concepts according to the exemplary aspects of the invention will be explained in more detail. These concepts relate to controlling V2V communication between V2V communication devices. The V2V communication may be used to implement a transport system application, for example an ITS application, based on the transmission of V2V communication messages, for example CAMs, between the V2V communication devices. In this respect, a transport system may denote a system utilized in the area of transportation, for example passenger and/or cargo transportation. Such a system might be different from a transport layer of a layered based communication model of a communication network, for example a cellular network. The transport system application may provide respective functionalities in the transport system.

According to the concepts, the V2V communication can be performed by a V2V communication device using a first radio technology for performing the V2V communication and a second radio technology for accessing a cellular network. For example, the first and second radio technologies are different from one another. The first radio technology may have a smaller transmission area in which V2V communications may be transmittable compared to a transmission area in which the V2V communication messages may be transmittable via the second radio technology.

The first radio technology may be embodied, for example, as an ad-hoc Wireless Local Area Network (WLAN) according to IEEE 802.11p or LTE device-to-device (D2D). A corresponding transmission area of the CAMs may be up to few hundred meters. Further, a typically used transmission frequency of the CAMs may be about 10 Hertz (Hz). The second radio technology may be defined as specified by Third Generation Partnership Project (3GPP) or by 3GPP2. The cellular network may implement one or more radio technologies, such as Global System for Mobile Communication (GSM), Universal Terrestrial Mobile Telecommunication System (UMTS) or Wideband Code Division Multiple Access (CDAM), CDMA2000, WiMaX, 3GPP Service Architecture Evolution (SAE)/LTE, and/or 3GPP LTE-Advanced.

Hence, according to the exemplary aspects of the invention, a hybrid V2V communication device may be provided, which may operate in accordance with the first and second radio technologies. Resources for transmitting V2V communication messages, for example the above-mentioned CAMs, may be allocated in accordance with a determined distribution scheme specifying a distribution of the V2V messages to be sent via the first and second radio technologies. The determined distribution scheme may represent a static distribution scheme, hence may be once determined and applied in future by the V2V communication device without further changes to the determined distribution scheme. Alternatively, the determined distribution scheme may be dynamically determined, in order to adapt the V2V communication of the V2V communication device to changes in the surrounding of the V2V communication device. In this respect, the latter mentioned changes may form constraints for the V2V communication.

Therefore the V2V communication of the V2V communication device may be easily and efficiently controlled by utilizing the determined distribution scheme in the V2V communication device. In particular, the V2V communication device might not need to determine on a per V2V communication message basis the radio technology via which the V2V communication message should be sent considering current constraints presented by the cellular network and/or the V2V communication device. Further, a single equipment, namely the V2V communication device, may be utilized for communication both via the first radio technology and the second radio technology.

An enhanced V2V communication may be enabled by employing beneficial selected characteristics of the first and second radio technologies, such as reliability, availability, costs and efficiency while, at the same time, at least reducing or even avoiding and/or mutually compensating drawbacks of the first and second communication technologies. In particular, such a type of V2V communication may not be achieved by using only one of the first and second radio technologies. In this respect, by utilizing the second radio technology for the V2V communication, the second radio technology may take a fraction of V2V communication messages not being transmittable via the first radio technology, for example in a case in which the traffic capacity via the first radio technology may be consumed.

For example, the first radio technology may offer transmission of a high traffic load by utilizing a complete frequency range dedicated for the V2V communication, for example a 5.9 GHz band used by the IEEE 802.11p standard. On the other hand, a transmission reliability of the first radio technology for the V2V communication messages may depend on a frequency of the transmitted V2V communication message and/or may be low owing to not existing mechanisms for ensuring successful transmission of the V2V communication messages, for example in the event of packet loss, connectivity loss, packet collision, transmission error and/or delay in the transmitting V2V communication device.

For example, the transmission via the second radio technology may be efficient and reliable, and the second radio technology may be a ubiquitously available technique. Further, the transmission via the second radio technology may be cost-effectively utilized, since transmission capabilities of a vehicle in or on which the V2V communication device can be mounted may be present for non V2V communication purposes and can be reused for the V2V communication with low extra costs. On the other hand, the second radio technology might not support a required high traffic load for the V2V communication, since a revenue for utilizing the second radio technology for the V2V communication may be lower compared to a utilization of the second radio technology for conventional data traffic between a terminal and the cellular network and/or a transmission capacity via the second radio technology may be limited depending on time and/or location.

Next, further embodiments of the method for controlling V2V communication may be explained. These embodiments also apply to the other methods, the V2V communication device, the node, the entity, the communication system, and the computer programs.

The distribution scheme may represent a configuration for the V2V communication device which may specify a filtering of V2V communication messages according to a radio interface to be used for a transmission thereof and may accordingly distribute the V2V communication messages towards a first radio interface of the V2V communication device operating in accordance with the first radio technology and towards a second radio interface of the V2V communication device operating in accordance with the second radio technology. The V2V communication messages may be, for example, generated by the transport system application residing in the V2V communication device.

The determined distribution scheme may specify a transmission rate in accordance with which the V2V communication messages may be to be transmitted via the first and/or second radio technologies. In this respect, the transmission rate may relate to a fraction of V2V communication messages among a specified number of consecutively transmitted V2V communication messages which may be to be sent via the first and/or second radio technologies. A sequence of the V2V communication messages transmitted via the first radio technology and transmitted via the second radio technology might be not defined by the transmission rate. In particular, a particular specified transmission rate of V2V messages to be transmitted via one radio technology may accordingly define a transmission rate of the other V2V messages to be transmitted via the other radio technology. For example, a transmission rate via the first radio technology may correspond to 9/10, i.e. 9 V2V communication messages out of a group of 10 V2V communication messages may have to be sent via the first radio technology with a sequence of the V2V communication messages being not specified. A corresponding transmission rate via the second radio technology may accordingly be $1/10$. This measure may increase a reliability of a successful transmission of the V2V communication messages and meanwhile compensating a load on both radio technologies. In particular, a suitable selection of the transmission rate may enable to transmit as much V2V communication messages as possible via the first radio technology, in order to utilize the beneficial characteristics of the first radio technology pertaining to costs, traffic capacity, and a time and/or location independent transmission possibility.

The determined distribution scheme may specify a transmission frequency in accordance with which V2V communication messages may be to be transmitted via the first and/or second radio technologies. In this respect, a transmission frequency of V2V communication messages may correspond to a defined number of the V2V communication messages to be transmitted and to a time occurrence of the V2V communication messages to be transmitted in a group of consecutively transmitted V2V communication messages to be transmitted. As explained above, a transmission frequency of a V2V communication via one radio technology may accordingly specify a transmission frequency of V2V communication messages via the other radio technology, particularly assuming a total transmission frequency of the V2V communication messages via the first and second radio technologies may be known. The total transmission frequency may be defined by a potentially usable maximum transmission frequency of the V2V communication messages via the first radio technology. For example, a transmission frequency of 1 Hz via the first radio technology may specify that 1 V2V communication message of a group of consecutively transmitted V2V communication messages may be to be transmitted per second via the dedicated radio technology. Under the assumption that a total number of V2V messages per second may be known, a transmission frequency of the V2V messages via the second radio technology can be accordingly derived. Therefore, as explained above, a reliability of a successful transmission of the V2V communication messages may be enabled while decreasing load on both radio technologies. In particular, a suitable selection of the transmission frequency may enable to transmit as much V2V communication messages as possible via the first radio technology, in order to utilize the characteristics of the first radio technology pertaining to costs, traffic capacity, and a time and/or location independent transmission possibility.

The determined distribution scheme may specify that all V2V communication messages may be to be transmitted via the first radio technology and a subset of the V2V communication messages may be to be transmitted via the second radio technology. This measure may decrease load on the second radio technology and reduce costs for the transmission of the V2V communication messages despite utilizing the second radio technology, while ensuring that the subset of V2V communication messages may be expected to be successfully received by a recipient because of the transmission thereof via the second radio technology.

The determined distribution scheme may specify that a V2V communication message having a certain priority may be to be transmitted via the second radio technology, and a V2V communication message having a priority different from the certain priority may be to be transmitted via the first radio technology. In particular, the certain priority may be higher than the different priority. Therefore, transmission reliability of the V2V communication messages and a successful reception thereof may be enhanced, while still providing the V2V communication at low costs.

The priority of a V2V communication message may be defined based on a content of the V2V communication message and/or a type of the V2V communication message. A content of the V2V communication message may relate, for example amongst others, to a current geographical position of the V2V communication device, a speed of the V2V communication device, and/or basic attributes of a vehicle in or on which the V2V communication device may be mounted. Such an attribute may relate to, for example, to an identification of the corresponding vehicle, a usage of the corresponding vehicle, a technical specification of the corresponding vehicle such as length, engine power, brand of the corresponding vehicle or the like. A type of a V2V communication message may relate to a purpose of a transmission of the V2V communication message. Such a purpose may be an accident warning, an emergency vehicle approaching, or the like. For example, a V2V communication message indicating an accident warning may have a higher priority than normal V2V communication messages used to disseminate, for example, the location of the vehicles in or on which the V2V communication device may be mounted. Therefore the V2V communication messages can be beneficially transmitted in accordance with their inherently defined importance. The step of transmitting the V2V communication messages may comprise determining the priority of the respective V2V communication messages to be transmitted and transmitting the V2V communication messages in accordance with the distribution scheme.

The distribution scheme may be determined for a certain coverage area of the second radio technology. For example, the coverage area may correspond to one or more cells served by an access node operating in accordance with the second radio technology. In particular, two distribution schemes may be determined for mutually exclusive coverage areas. In this case, the two distribution schemes may be different or may be identical to one another. Limiting a distribution scheme to a particular geographical area may allow tailoring the V2V communication to network- and/or device-based constraints in this geographical area such that the efficiency, costs, reliability and availability of the V2V communication can be adapted to these constraints.

The distribution scheme may be determined by a V2V communication device or by a node of the cellular network. The V2V communication device may the V2V communication device according to the exemplary aspects, which V2V communication device may control its transmission of the V2V communication messages in accordance with the distribution scheme, or may be a further different V2V communication device. The node may be an access node operating in accordance with the second radio technology or a transport system server which may be particularly located in a core network of the cellular network. In the first configuration, a determination of the distribution scheme by a V2V communication device may allow for controlling the V2V communication even in a case of connectivity failure towards the cellular network via the second radio access technology. Further, network resources associated with distributing the distribution scheme over a radio link and processing complexity of the V2V communication device not determining the distribution scheme may be low. In the second configuration, the determination of the distribution scheme on the network side may provide a central network entity to which multiple V2V communication devices may be equally connectable in a particular coverage area of the second radio technology for receiving the determined distribution scheme. Processing complexity of the V2V communication devices may be low. A determination of the distribution scheme by the access node may provide an efficient measure in that the access node may be involved in the transmission of the V2V communication messages and may use inherent information related to an actual data transmission via the second radio technology. Determining the distribution scheme by a transport system server outside of a coverage area of the second radio technology may enable to reuse the same network node for determining distribution schemes associated with different second radio technologies.

The method may further comprise transmitting the determined distribution scheme to the V2V communication device in a broadcast transmission or in a unicast transmission. In the first configuration, the distribution scheme may be beneficially transmitted at the same time instance to all V2V communication devices listening to the broadcast transmission in an easy and efficient way. In the second configuration, network resources can be saved, since a particular V2V communication device can be precisely addressed, for example in in the event of a regular update of the distribution scheme for a coverage area of an access node which may be smaller than the total coverage area of the access node.

In particular, in a case in which the distribution scheme may be determined by the V2V communication device or the further V2V communication device, the distribution scheme may be transmitted via the first radio technology. In such a case, the distribution scheme may be included in a regularly transmitted V2V communication message which may be particularly broadcasted. Alternatively or additionally, the distribution scheme may be also transmitted, particularly broadcasted, in a separate V2V communication message upon determining the distribution scheme. Alternatively or additionally, the distribution scheme may be transmitted via the second radio technology to the node of the cellular network which may then transmit the distribution scheme via the second radio technology, for example in a broadcast transmission or in a unicast transmission, to respective receiving V2V communication devices.

In particular, in a case in which the distribution scheme may be determined by the access node, the distribution scheme may be transmitted via the second radio technology, for example in a broadcast transmission or in a unicast transmission to a respective receiving V2V communication device or respective receiving V2V communication devices.

In particular, in a case in which the distribution scheme may be determined by the transport system server, the distribution scheme may be transmitted via the second radio technology, for example in a broadcast transmission or in a unicast transmission to respective receiving V2V communication devices. In a case in which the transport system server may be located in the core network, the distribution scheme may be firstly transmitted, for example in a unicast transmission, to a respective access node operating in accordance with the second radio technology which then further transmits the distribution scheme via the second radio technology, as beforehand explained.

The determined distribution scheme may be transmitted in a handover command to the V2V communication device when the V2V communication device may enter a coverage area of the second radio technology for which the distribution scheme may have been determined. This measure may allow for communicating the distribution scheme in an efficient way and also only upon necessity.

The distribution scheme may be determined based on information relating to a density of entities comprising transmission capabilities for transmission via the first radio technology in a certain coverage area of the second radio technology at a given time. These entities may be V2V communication devices and/or fixed infrastructure nodes operating in accordance with the first radio technology. In this respect, the V2V communication devices being enabled for V2V communication via the first radio technology may form an ad-hoc network for the V2V communication. The fixed infrastructure nodes may offer an increase of the transmission area for the V2V communication messages to be transmitted via the first radio technology by forwarding received V2V communication messages to further recipients. For example, the distribution scheme may specify a larger fraction of the V2V communication messages to be sent via the first radio technology, if the density of the entities may be sufficiently high, as the latter may cause a sufficient good availability of the first radio technology for the V2V communication and thus a reliable transmission of the V2V communication messages via the first radio technology.

In particular, one or more V2V communication devices and/or one or more infrastructure nodes, particularly each V2V communication device and/or infrastructure node, may communicate its own capability to another V2V communication device or to a node of the cellular network for the determination of the distribution scheme. The respective information may be transmitted in a separate message via the second radio technology and/or may be included in a V2V communication message, for example, as separate identifier. Additionally or alternatively, the node of the cellular network, particularly the access node or the transport system server, may monitor the density of the entities and may provide the corresponding information to the V2V communication device determining the distribution scheme. Additionally or alternatively, a sensor located in the certain coverage area may provide the respective information by monitoring the V2V communication traffic and optionally by deriving a number or density of the entities in the certain coverage area. In this respect, a sensor may represent a device adapted to monitor respective information and optionally to determine a parameter value based on the monitored information. Such a sensor may be temporarily or permanently installed in the certain coverage area, for example in a construction area or at a tunnel entrance, and may monitor the respective number of devices.

In particular, in order to determine its own transmission capability via the first radio technology, the respective V2V communication device may determine a kind of one or more radio interfaces of the V2V communication device. In particular, the V2V communication device may determine that the V2V communication device may comprise transmission capabilities for transmission via the first radio technology, if at least one of the one or more radio interfaces of the V2V communication device may operate in accordance with the first radio technology, and may determine that the V2V communication device may be free of such transmission capabilities else.

Additionally or alternatively, the distribution scheme is determined based on information relating to an average connectivity via the first radio technology in a certain coverage area of the second radio technology at a given time. In particular, the coverage area and/or the given time for which the density of entities may be defined may be different or identical to the coverage area and/or the given time, respectively, for which the average connectivity may be defined. The density of entities comprising transmission capabilities for transmission via the first radio technology may contribute to a level of the average connectivity. Further, information such as a traffic load via the first radio technology may also impact the average connectivity. As mentioned above, the distribution scheme may specify a larger fraction of the V2V communication messages to be sent via the first radio technology, if the average connectivity via the first radio technology may be high.

Additionally or alternatively, the distribution scheme may be determined based on information relating to an available transmission capacity to be, particularly potentially, usable for the V2V communication via the second radio technology in a certain coverage area of the second radio technology at a given time. In particular, the coverage area and/or the given time for which the density of entities and/or the average connectivity may be defined may be different or identical to the coverage area and/or the given time, respectively, for which the available transmission capacity may be defined. The available transmission capacity may impact, for example, the transmission rate and/or the transmission frequency with which the V2V communication messages can be transmitted via the second radio technology. In particular, the available transmission capacity may be determined by the access node. For example, the distribution scheme can specify a higher number of the V2V communication messages to be transmitted via the second radio technology, if the available network capacity for the V2V communication can be sufficiently high. The accordingly determined distribution scheme may specify that as many V2V communication messages as possible can be transmitted via the second radio technology.

Additionally or alternatively, the distribution scheme may be determined based on information relating to a priority and/or a type of a V2V communication message to be transmitted. In such a case, the priority may be defined by a transport system application, for example residing in the V2V communication device, or by a transport system function, for example residing in the transport system server or in the access node which may particularly implement such a transport system function. In this respect, the transport system function may represent a network side counterpart functionality for the transport system application in a transport system implemented in the cellular network. Hence, the V2V communication device may represent a client to a respective server of the transport system, which server may implement the transport system function. The priority of a V2V communication message may impact, for example, the selection of the subset of V2V communication messages to be transmitted via the second radio technology, the transmission rate and/or the transmission frequency with which the V2V communication message may be to be transmitted via the second radio technology and/or the priority level based transmission of the V2V communication messages. A sending of the V2V communication message having a high priority via the second radio technology may enable a reliable transmission and a successful reception thereof.

Additionally or alternatively, the distribution scheme may be determined based on information relating to a required transmission area in which a V2V communication message may have to be transmitted. This information may be provided by the transport system application, for example residing in the V2V communication device, or the transport system function, for example residing the access node or the transport system server. For example, the higher the required transmission area for transmitting the V2V communication message may be, the more likely the distribution scheme may specify that the V2V communication message or a larger fraction of multiple V2V communication messages may have to be transmitted via the second radio technology, optionally in addition to a duplication of the V2V communication message via the first and second radio technology. On the contrary, a low required transmission area may lead to a distribution scheme specifying a transmission of the V2V communication message or a larger fraction of the multiple V2V communication messages via the first radio technology.

In particular, an accuracy of the determined distribution scheme with respect to constraints in a surrounding of the V2V communication device may be high, since one or more of the above described information may be used as input for the determination of the distribution scheme.

At least one of the above information may be provided by an entity, particularly the V2V communication device according to the exemplary aspects, a further V2V communication device, by the node or by the sensor. In particular, the information relating to the priority and/or the type of the V2V communication message and/or the required transmission area may be provided by the transport system application or function of a respective entity.

In particular, the step of providing may comprise providing the respective information for example from a transport system application or function to at least one processor of the respective entity. Additionally or alternatively, the step of providing may comprise monitoring the at least one information for example during a defined time interval or in a continuous way. Additionally or alternatively, the step of providing may comprise transmitting the respective information via the first radio technology. Additionally or alternatively, the step of providing may comprise transmitting the respective information over the cellular network via the second radio technology. Additionally or alternatively, a similar type and/or a different type of information may be provided by one entity or by multiple entities as input for the step of determining.

In particular, the V2V communication device may transmit, for example broadcast or use a unicast transmission, the information to another V2V communication device via the first radio technology. Additionally or alternatively, the V2V communication device may transmit the information to the access node via the second radio technology, and the access node may forward, for example broadcast or using a unicast transmission, the information to one or more V2V communication devices.

In particular, the access node may transmit the information via the second radio technology to the V2V communication device, for example using a broadcast or unicast transmission.

In particular, the transport system server may transmit the information via the second radio technology to the V2V communication device, for example using a broadcast or unicast transmission. In a case in which transport system server may be located in the core network, the transport system server may firstly send the respective information to an access node of the cellular network. The latter may also apply for the transmission of the information to the access node determining the distribution scheme.

In particular, the sensor may transmit the information via the first radio technology or via the second radio technology.

Next, further exemplary embodiments of the V2V communication device will be explained. However, these embodiments also apply to the methods, the node, the entity, the communication system and the computer programs.

The V2V communication device may be adapted to perform a method described above. To this end, the V2V communication device may comprise corresponding program code stored, for example, in a memory of the V2V communication device and/or corresponding hardware structure, for example at least one radio interface, one or more processors, and/or a memory. The V2V communication device may also implement a transport system application.

The V2V communication device may be comprised in a vehicle for passenger transport and/or cargo transport.

Next, further exemplary embodiments of the node will be explained. However, these embodiments also apply to the methods, the V2V communication device, the entity, the communication system and the computer programs.

The node may be adapted to perform a method described above. To this end, the node may comprise corresponding program code stored, for example, in a memory of the node and/or corresponding hardware structure, for example on or more suitable interfaces, one or more processors, and/or a memory. The node may implement a transport system function, as explained above.

The node may be adapted as an access node operating in accordance with the second radio technology or a transport system server, particularly an ITS server. The access node may be adapted to manage radio resource allocation for a transmission via the second radio technology, hence may be adapted as a radio resource management node of an access network, for example, an eNodeB or a Radio Network Controller. The access node may also implement a transport system function. The transport system server may be part of a cloud or may form an individual separate network element.

Next, further exemplary embodiments of the entity will be explained. However, these embodiments also apply to the methods, the V2V communication device, the node, the communication system and the computer programs.

The entity may be part of the cellular network and may be accordingly embodied as an access node operating in accordance with the second radio technology or as a transport system server, for example a ITS server. The entity may be also connectable to the cellular network and may be accordingly embodied as a V2V communication device or a sensor. The entity may comprise corresponding program code stored, for example, in a memory of the entity and/or corresponding hardware structure, for example one or more interfaces, one or more processors, and/or a memory. The entity may implement a transport system application or function.

Figure 1:
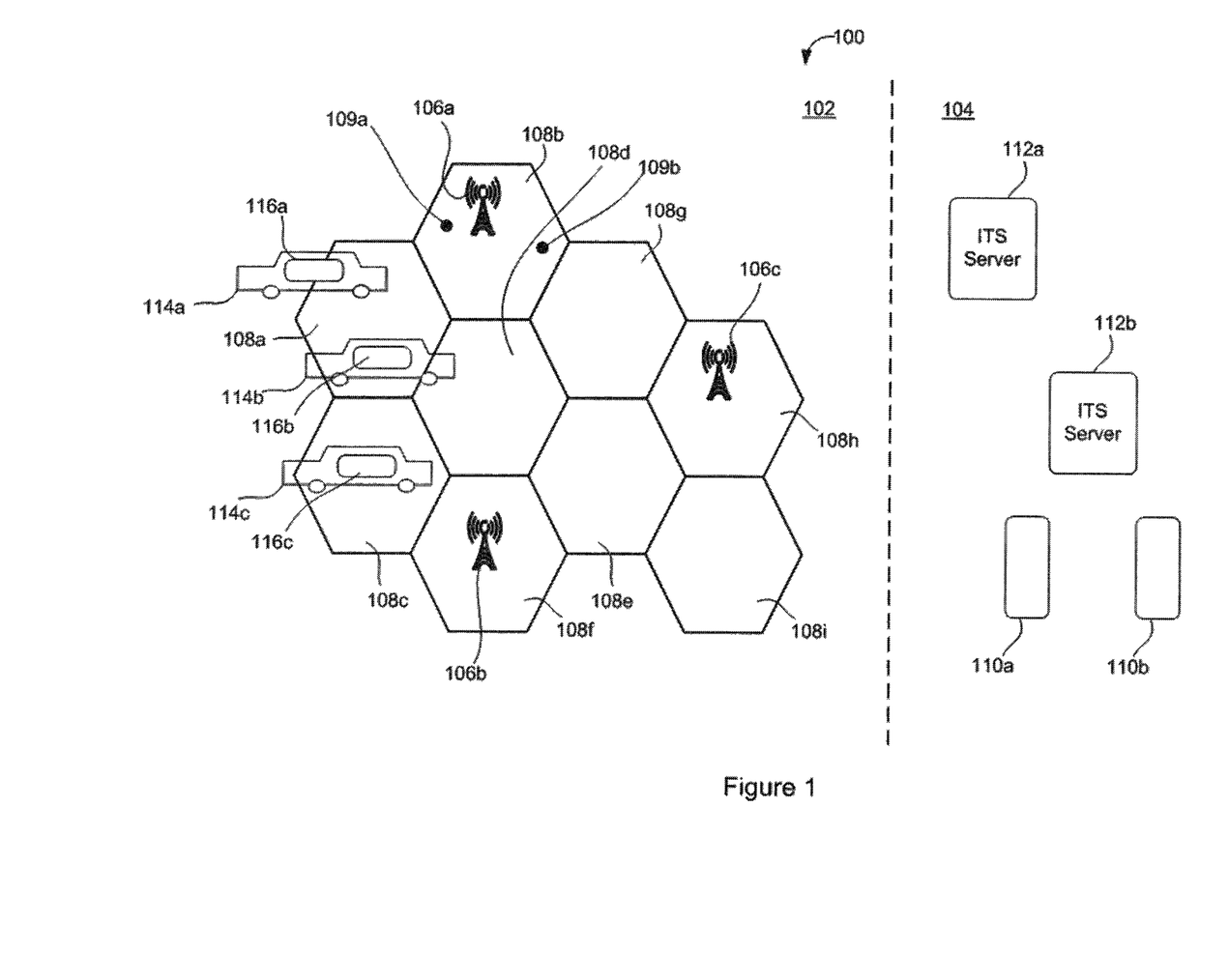
FIG. 1 is a block diagram schematically illustrating a V2V communication scenario in which concepts according to embodiments of the invention are applied.

Referring to FIG. 1, a communication scenario in accordance with an embodiment of the invention will be described in more detail. A corresponding communication system 100 comprises a radio access network 102 and a core network 104, both of which forming a cellular network.

The radio access network 102 comprises one or more access nodes 106a-106c. For example, the radio access network 102 uses LTE as radio technology for communication, and the access nodes 106a-106c are accordingly embodied as eNodeBs. Alternatively, the radio access network 102 may be embodied as GERAN with the access nodes 106a-106c being embodied as Base Stations (BS) and/or Base Transceiver Stations (BTS). Alternatively, the radio access network 102 may also be adapted as UTRAN with the access nodes 106a-106c being embodied as NodeBs and/or Radio Network Controllers (RNC). Further, each access node 106a-106c serves one or more cells 108 and may manage a radio resource allocation in the radio access network 102 depending on the particular embodiment of the access node 106a-106c. In the described embodiment, each eNodeB 106a-106c serves three cells 108a-108c, 108d-108f, 108g-108i. The served cells 108a-108c, 108d-108f and 108g-108i correspond each to a respective individual coverage area of each eNodeB 106a-106c for which a distribution scheme associated with a control of V2V communication in the communication system 100 is defined. One or more sensors 109a, 109b are permanently installed in a ground in a mesh-like arrangement over the radio access network 102. For ease of illustration, only two sensor 109a, 109 are displayed in FIG. 1.

The core network 104 comprises one or more control nodes 110a, 110b and/or one or more transport system servers 112a, 122b. In the described embodiment, the core network 104 comprises a packet switched domain being embodied as Evolved Packet Core (EPC) and comprising control nodes 110a, 110b in the form of Mobility Management Entities (MMEs). The transport system servers 112a, 112b may be distributed in a cloud over the core network 104 or may form independent network entities. Additionally or alternatively, the core network 104 may comprise a circuit switched domain which may comprise one or more control nodes in the form of Mobile Switching Center (MSC) servers.

Vehicles 114a-114c for passenger and/or cargo transport are moving in a coverage area of the radio access network 102. The vehicle 114a is an emergency vehicle, while the vehicles 114a, 114c are embodied as vehicles owned by private persons. Each vehicle 114a-114c comprises one V2V communication device 116a-116c adapted to operate in accordance with a first radio technology for performing V2V communication, which radio technology may, for example, may operate according to the IEEE 802.11p standard. Transmitted V2V communication messages are CAMs. Further, the V2V communication devices 116a-116c are adapted to operate in accordance with a different second radio technology offered by the radio access network 102, namely LTE. The communication system 100 may form an ITS system, and the transport servers 112a, 112b may be ITS servers.

Figure 2:
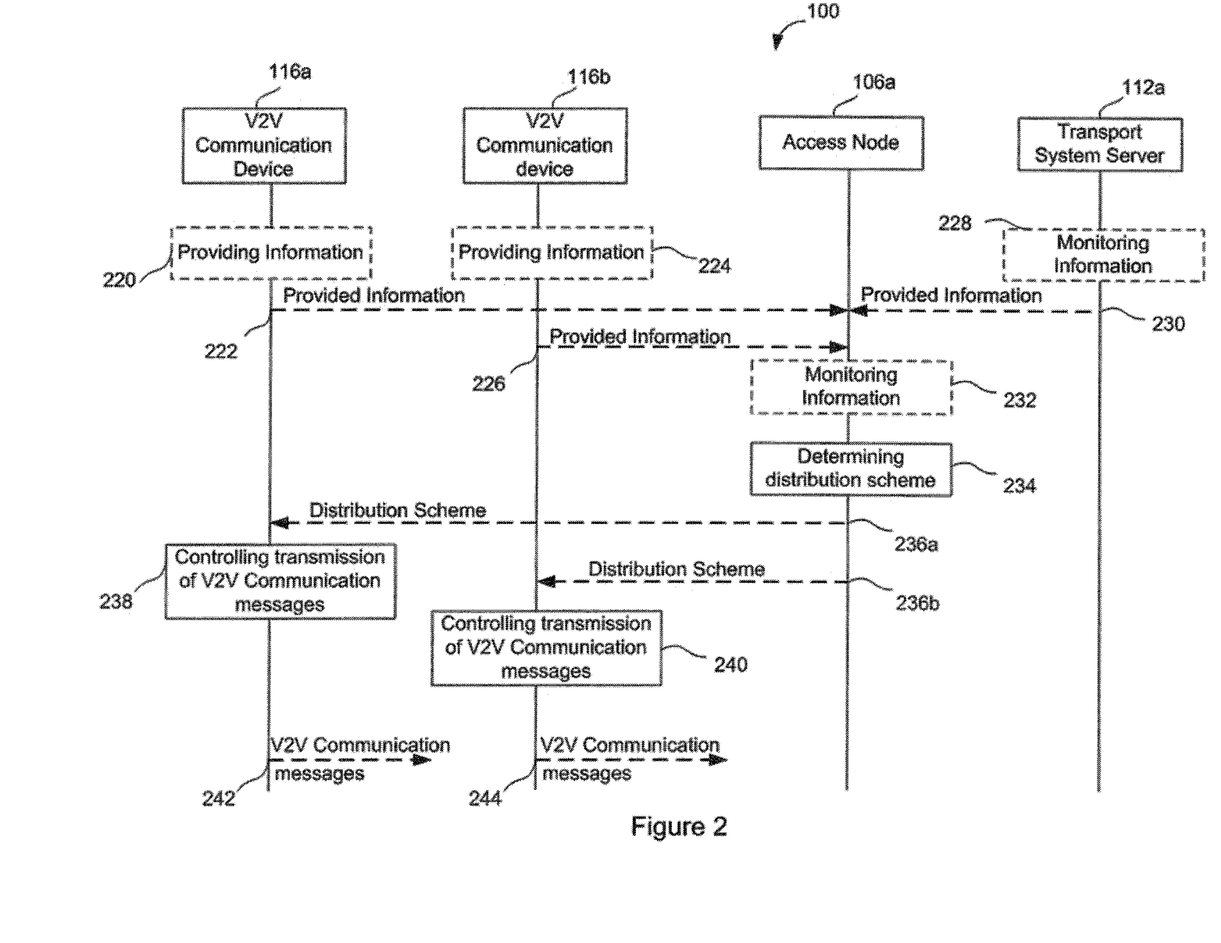
FIG. 2 is a signaling diagram schematically illustrating a method for controlling a V2V communication according to an embodiment of the invention.

Referring to FIG. 2, a method usable in association with controlling V2V communication according to an embodiment of the invention will be explained. An underlying communication system 100 corresponds to the communication system 100 illustrated in FIG. 1.

In a first step 220 of the method, the V2V communication device 116a provides information relating to a priority of the V2V communication messages to be transmitted, a required transmission area for the V2V communication messages and its own capabilities for transmission via the first radio technology. The identified priority of the V2V communication messages corresponds to high and is defined in accordance with a vehicle attribute of the vehicle 114a, for example an attribute indicating the vehicle 114a being an emergency vehicle. The required transmission area may correspond to the cells 108a-108c, and the information relating to the priority of the V2V communication messages and the required transmission area may be provided from a transport system application of the V2V communication device 116a, for example a ITS application, towards a radio interface of the V2V communication device 116a. The information relating to its own transmission capabilities may be provided from its one or more processors to its radio interface. In a next step 222, the provided information is transmitted to the access node 106a in the same, in two or separate messages via the second radio technology.

Thereupon, the V2V communication device 116b provides in a next step 224 information relating to its own transmission capabilities for transmission via the first radio technology, for example from its one or more processors towards its radio interface. In a next step 226, the V2V communication device 116b transmits the provided information to the access node 106a via the second radio technology.

In a next step 228, a transport system server 112a of a core network 104 of the communication system 100 monitors information relating to an average connectivity via fixed infrastructure nodes located in the served cells 108a-108i and operable in accordance with the first radio technology for performing the V2V communication. To this end, the transport system server 112a receives, for example, periodically information related to the number of infrastructure nodes from the sensors 109a, 109b, which information has been forwarded by the access nodes 106a-106c. The sensors 109a, 109b in turn have monitored available traffic via the first radio technology in the particular served area of the cells 108a-108i. The transport system server 112a then calculates the average connectivity in the coverage area 108a-108c. Further, the transport system server 112a transmits in a subsequent step 230 the respective information to the access node 106a via its network interface over a core network link between the access node 106a and the transport system server 112a.

It is noted that a sequence of the steps 220, 222, the steps 224, 226 and/or the steps 228, 230 can be different from the above described embodiment.

In a next step 232, the access node 106a monitors information relating to a priority of the V2V communication messages to be transmitted, information relating to a required transmission area for these V2V communication messages, information relating to capabilities for transmission via a particular radio technology in its serving area 108a-108c at a current time and information relating to its own available transmission capacity for the V2V communication via the LTE radio technology in its serving area 108a-108c at this particular time. To this end, the access node 106a uses its radio interface and its network interface towards the transport system server 112a.

Thereupon, in a next step 234, the access node 106a determines a distribution scheme for distributing a transmission of V2V communication messages among the radio technology for performing the V2V communication and the LTE radio technology. To this end, the access node 106a uses all monitored information and evaluates a best effort distribution scheme in view of available resource capacities of the access node 106a, costs and reliability for transmission of the V2V communication messages via the first and second radio technologies and average connectivity via the first and second radio technologies.

During the determination of the distribution scheme, the access node 106a determines the available transmission capacity via the second radio technology by monitoring its used capacity in terms of already allocated resources for a data transmission different from the V2V communication messages and its free capacity not being used for communication in terms of its not allocated resources, and accordingly determines its available transmission capacity for the V2V communication via the second radio technology.

The determination further comprises a determination of a total average connectivity via the first radio technology in the cells 108a-108c at the current time by means of evaluating an average connectivity provided by the V2V communication devices 116a-116c at the current time. To this end, a number of the V2V communication devices 116a, 116b who have provided their transmission capabilities in the steps 222, 226 is determined, optionally combined with a location of the respective V2V communication device 116a, 116b in the cells 108a-108c. Information related to the location may have also been determined by the access node 106a or provided by the respective V2V communication device 116a, 116b. The total average connectivity is then determined by suitably combining the average connectivity offered by the fixed infrastructure nodes and the average connectivity provided by the V2V communication devices 116a-116d in the served cells 108a-108c.

In the determination of the distribution scheme, the V2V communication messages having the high priority indicated by the V2V communication device 116a are given precedence over other V2V communication messages being free of an assigned priority and/or having a lower priority.

The determined distribution scheme specifies that all V2V communication messages are to be transmitted via the first radio technology for performing the V2V communication, wherein a subset of these V2V communication messages is to be transmitted via the second LTE radio technology. The subsets of the V2V communication messages are selected based on its priority, and those V2V communication messages having a high priority are part of the subset. The subset of these V2V communication messages are to be transmitted in accordance with a transmission rate of ¹/₁₀, if enough V2V communication messages having a high priority are to be transmittable in the V2V communication device 116a, 116b, and else no transmission rate is applied to the subset of V2V communication messages.

In a next step 236a, 236b the access node 106a broadcasts the determined distribution scheme to all V2V communication devices 116a, 116b being currently located in its serving area 106a-106c via the second radio technology. In a next step 238, 240, the respective V2V communication device 116a, 116b controls the transmission of V2V communication messages to be transmitted in accordance with the distribution scheme by implementing the distribution scheme in the respective V2V communication device 116a, 116b. In a subsequent step 242, 244, the respective V2V communication device 116a, 116b transmits the V2V communication messages using the radio technology for performing the V2V communication and the LTE radio technology based on the step 238, 240 of controlling.

Instead of distributing the distribution scheme in the steps 236a, 236b via broadcasting, the distribution scheme can be transmitted to the respective V2V communication device 116a, 116b via the second radio technology in a handover command upon the V2V communication device 116a, 116b entering the serving area 108a-108c of the access node 106a. Assuming the V2V communication device 116a to enter the coverage area formed by the cells 108a-108c, the V2V communication device 116a might not be considered in the distribution scheme received in the handover command but may be considered in future determined distribution schemes distributed to other V2V communication devices 116a, 116b.

Further, the step 234 may be performed by the transport system sever 112a which may accordingly receive the described information required for the determination of the distribution scheme from the V2V communication devices 116a, 116b, particularly via the access nodes 106a-106c, and from the access node 106a. The determined distribution scheme may be then transmitted over the core network link to one or more access nodes 106a-106, which in turn broadcast the distribution scheme to the V2V communication devices 116a-116c using the second radio technology.

Figure 3:
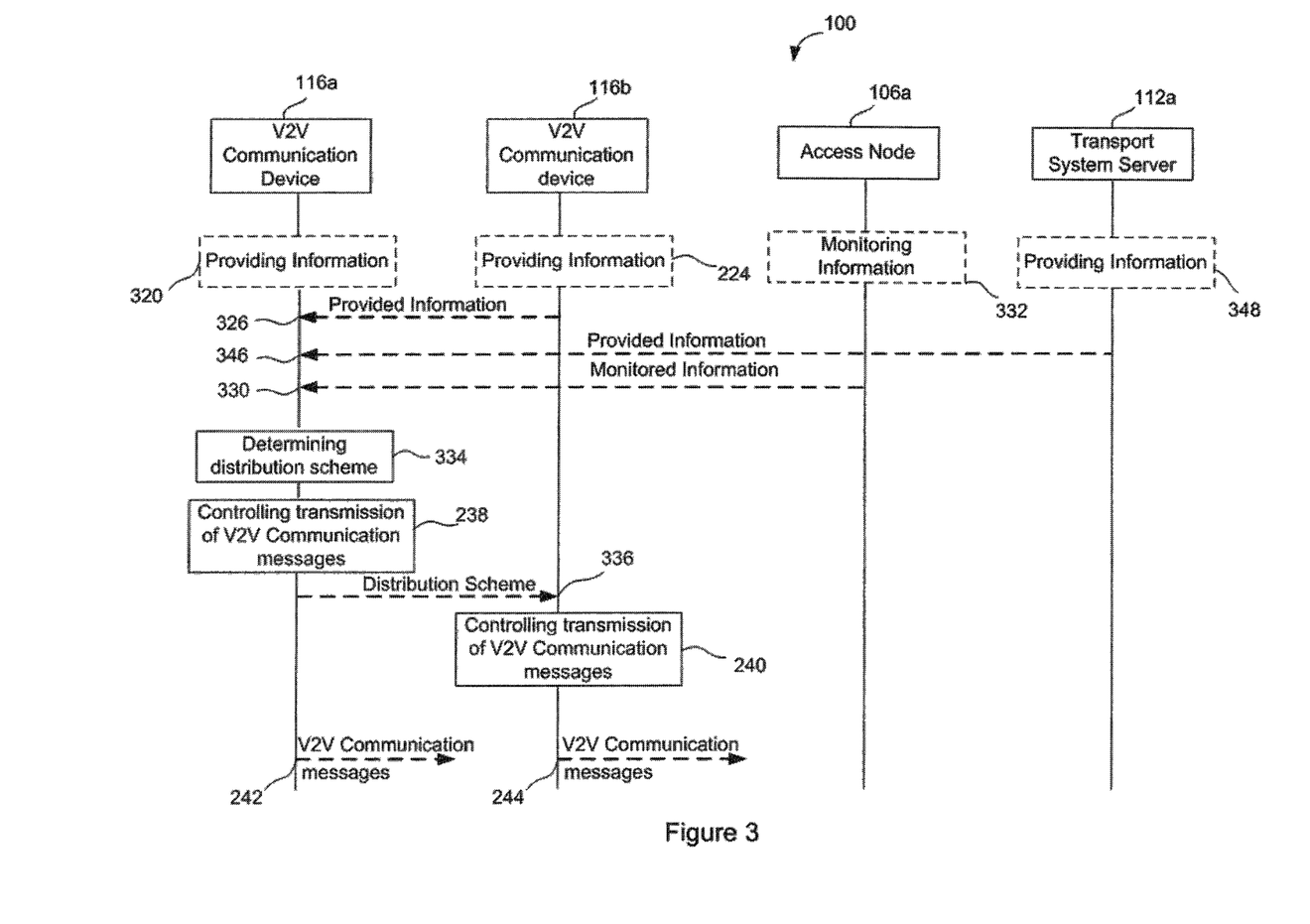
FIG. 3 is a signaling diagram schematically illustrating a method for controlling a V2V communication according to an embodiment of the invention.

Referring to FIG. 3, a method for controlling V2V communication according to another embodiment of the invention will be explained. An underlying communication system 100 associated with the method corresponds to the communication system 100 illustrated in FIG. 1.

In a first step 320 of the method, the V2V communication device 116a provides its transmission capabilities, for example from its memory to its one or more processors. Thereupon, a step 224 explained with reference to FIG. 2 is performed by the V2V communication device 116b. In a next step 326, the provided information is transmitted from the V2V communication device 116b to the V2V communication device 116a via the first radio technology. In a step 348, a transport system server 112a of a core network 104 of the communication system 100 provides information relating to a priority of the V2V communication messages to be transmitted in the coverage area 108a-108c served by the access node 106a. A first high priority is assigned to all V2V communication messages in which the geographical location of the respective transmitting V2V communication device 116a-116c is in the cell 108a. A second lower priority is assigned to all V2V communication messages in which the geographical location of a respective transmitting V2V communication device 116a-116c is in the cells 108b, 108c. In a next step 330, the provided information is transmitted from the transport system server 112a to the V2V communication device 116a via a core network link and the second radio technology.

Thereupon, a step 332 is performed during which information relating to an available free capacity for the V2V communication via the second radio technology, hence the radio technology of the radio access network 102 is monitored. The monitored information is transmitted in a next step 346 from the access node 106a to the V2V communication device 116a using the second radio technology.

It is noted that a sequence of the step 320, the steps 224, 326, the steps 232, 346 and/or the steps 348, 330 may differ from the above described embodiment.

In a next step 334, the V2V communication device 116a determines the distribution scheme to be used in the coverage area 108a-108c of the access node 106a using the information received in the steps 326, 330 and 346. The determined distribution scheme specifies that all V2V communication messages having the first priority are to be transmitted via the radio technology of the radio access network 102, while all V2V communication messages having the second priority are to be transmitted via the radio technology for performing the V2V communication. Thereupon, a step 238 explained with reference to FIG. 2 is performed by the V2V communication device 116a in terms of implementing the determined distribution scheme in a memory of the V2V communication device 116a and using the distributing scheme when controlling a transmission of V2V communication messages.

In a next step 336, the V2V communication device 116a transmits the distribution scheme 336 to the V2V communication device 116b in a V2V communication message using the first radio technology for performing the V2V communication. The distribution scheme may be included in a regularly transmitted V2V communication message or in a separate V2V communication message which may be transmitted when having determined the distribution scheme. Thereupon, in a step 240, the V2V communication device 116b, upon receipt of the distribution scheme, controls its transmission of V2V communication messages to be transmitted in accordance with the received distribution scheme. To this end, the V2V communication device 116b implements the distribution scheme in its memory. Thereupon, steps 242, 244 explained with reference to FIG. 2 are performed by the respective V2V communication device 116a, 116b.

Figure 4:
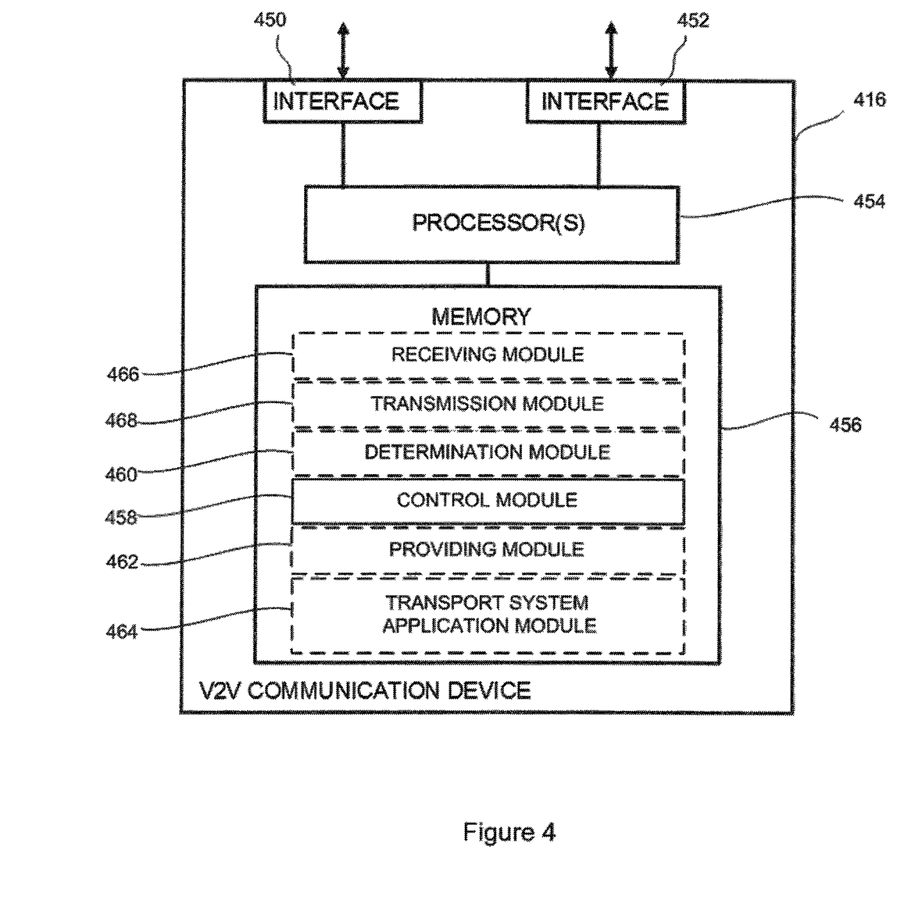
FIG. 4 is a block diagram schematically illustrating a V2V communication device according to an embodiment of the invention.

FIG. 4 illustrates an exemplary implementation of a V2V communication device 416. The V2V communication device 416 may correspond to the V2V communication device 116a, 116b, 116c described with reference to FIGS. 1 to 3. The V2V communication device 416 may be mounted on board a vehicle, for example a road vehicle for passenger and/or cargo transport.

The V2V communication device 416 is adapted to control V2V communication. The V2V communication is performable using a first radio technology for performing the V2V communication and a second radio technology for accessing a cellular network. The V2V communication device 416 is adapted to control a transmission of V2V communication messages in accordance with a determined distribution scheme for distributing a transmission of the V2V messages among the first radio technology and the second radio technology. The V2V communication device 416 may be also adapted to perform a method described above.

For example, the V2V communication device 416 comprises a first radio interface 450 for the V2V communication via the first radio technology. A second radio interface 452 of the V2V communication device 416 is adapted to operate in accordance with a radio technology for accessing the cellular network. One or more processors 454 of the V2V communication device 416 are coupled to the first radio interface 450 and the second radio interface 452. The one or more processors 454 are further coupled to a memory 456 of the V2V communication device 416. The memory 456 may include a Read-Only Memory (ROM), for example a Flash ROM, a Random-Access Memory (RAM), for example a Dynamic RAM (DRAM) or Static RAM (SRAM), a mass storage, for example a hard disk or a solid-state disk, or the like.

The memory 456 includes or stores suitable configured program code to be executed by the one or more processors 454, in order to implement the above-described functionalities of the V2V communication device 416. To this end, the program code in the memory 456 comprises a control module 458 implementing the functionalities for controlling the transmission of the V2V communication messages to be transmitted in accordance with the determined distribution scheme. The program code in the memory 456 may further comprise a determination module 460 for implementing functionalities relating to determining the distribution scheme. Further program code in the memory 456 includes a providing module 462 which may implement functionalities for providing information impacting a determination of the distribution scheme. A transport system application module 464 of the program code in the memory 456 may implement functionalities of a transport system application, for example an ITS application, for operating the V2V communication device 416 in accordance with a transport system, for example ITS. The program code in the memory 456 may further comprise a receiving module 466 for implementing functionalities for receiving information related to the control of V2V communication. A transmission module 468 of the program code of the memory 456 may implement functionalities for transmitting information related to controlling V2V communication, for example the information provided by means of the providing module 462 or a determined distribution scheme.

For example, the transport system application module 464 may implement functionalities for determining a priority of V2V communication messages, for example from a vehicle attribute included in the V2V communication messages. The providing module 462 may provide information, for example a priority of the V2V communication messages to be transmitted, from the transport system application to the at least one processor 454 and/or the first or second interface 450, 452. The providing module 462 may be also implement functionalities related to monitoring information. The control module 458 may further implement functionalities for implementing known control functionalities of a V2V communication device 416. The determination module 460 may also implement functionalities for determining the priority of the V2V communication messages to be transmitted when applying the distribution scheme.

According to another embodiment of the invention, a computer program may be provided. The computer program may comprise or may be embodied in at least one of the above mentioned modules 458-468 of the program code. The computer program is executable by the one or more processors 454 and may cause the V2V communication device 416 to perform an above described method. The computer program may be provided in a downloadable form or may be stored on a computer program product, for example a disk.

Figure 5:
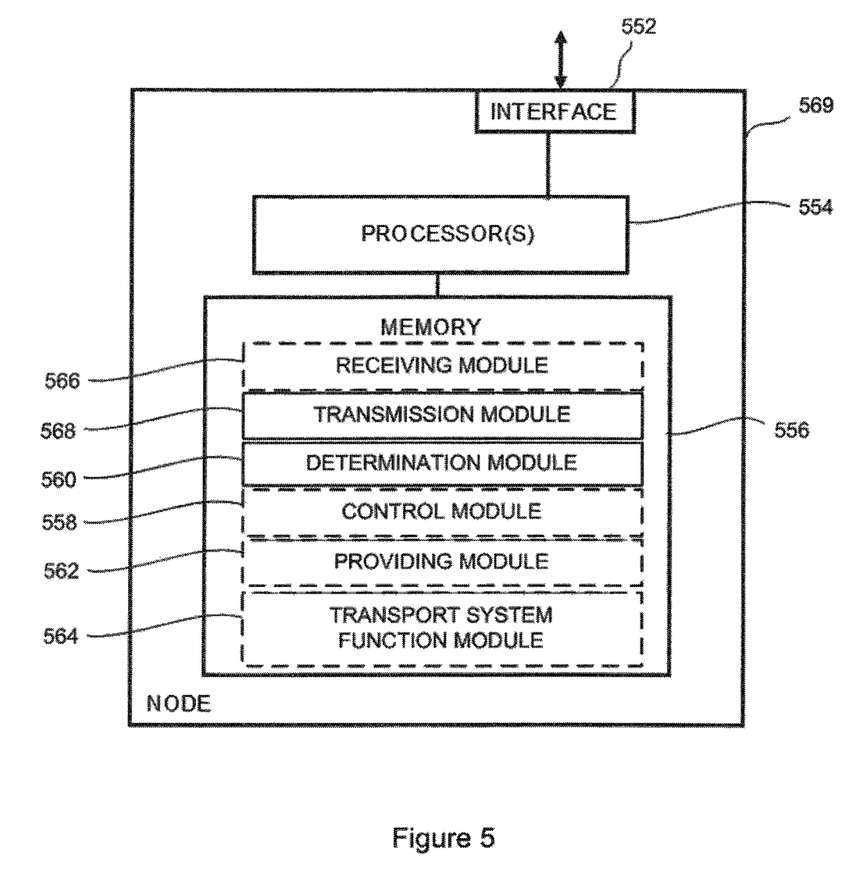
FIG. 5 is a block diagram schematically illustrating a node for a cellular network and being usable in association with controlling V2V communication according to an embodiment of the invention.

FIG. 5 illustrates an exemplary implementation of a node 569. The node 569 may correspond to the access node 106a-106c described with reference to FIGS. 1 to 3. Alternatively, the node 569 may correspond to the transport system server 112a being adapted to determine the distribution scheme, as described with reference to FIG. 2.

The node 569 is adapted for a cellular network, for example is part of the cellular network, and is usable in association with controlling V2V communication. The V2V communication is performable using a first radio technology for performing the V2V communication and a second radio technology for accessing the cellular network. The node 569 is adapted to determine a distribution scheme for distributing a transmission of V2V communication messages among the first radio technology and the second radio technology, and to transmit the determined distribution scheme to a V2V communication device. The node 569 is adapted to perform a method described above.

For example, the node 569 comprises a network interface 552 adapted to operate in accordance with the second radio technology for accessing the cellular network and/or for communication with further nodes, for example of a core network, of the cellular network. In a case in which the node 569 may be embodied as an access node, the interface may implement a radio interface and a network interface towards a core network. In a case in which the node 569 may be embodied as a transport system server, the interface 552 may be embodied as a network interface towards the core network and/or in accordance with the second radio technology. One or more processors 554 of the node 569 are coupled to the interface 552. The one or more processors 554 are further coupled to a memory 556 of the node 569. The memory 556 may include a Read-Only Memory (ROM), for example a Flash ROM, a Random-Access Memory (RAM), for example a Dynamic RAM (DRAM) or Static RAM (SRAM), a mass storage, for example a hard disk or a solid-state disk, or the like.

The memory 556 includes or stores suitable configured program code to be executed by the one or more processors 554, in order to implement the above-described functionalities of the node 569. To this end, the program code in the memory 556 may comprise a control module 558 implementing known control functionalities of a node 569. The program code in the memory 556 may further comprise a determination module 560 for implementing functionalities relating to determining the distribution scheme. A providing module 562 of the program code in the memory 556 may implement functionalities for providing information impacting a determination of the distribution scheme to be used by the one or more processors 556 when executing the determination module 560. A transport system function module 564 of the program code in the memory 556 may implement functionalities of a transport system function, for example an ITS function, for operating the node 569 in accordance with a transport system, for example ITS. The memory 556 may further comprise a program code in the form of a receiving module 566 for implementing functionalities for receiving information related to the control of V2V communication, for example information impacting the determination of the distribution scheme. A transmission module 568 of the program code in the memory 556 may implement functionalities for transmitting information related to controlling V2V communication, for example the determined distributing scheme and/or the information impacting the determination of the distribution scheme.

For example, the providing module 562 may implement functionalities related to monitoring information impacting the determination of the distribution scheme. The transport system function module 564 may implement functionalities for defining a priority of V2V communication messages, for example based on a vehicle attribute to be included in a V2V communication message. The providing module 562 may provide information, for example information relating to an available network capacity, from the first and/or second in the one or more processors 554.

According to another embodiment of the invention, a computer program may be provided. The computer program may comprise or may be embodied in at least one of the above mentioned modules 558-568. The computer program is executable by the one or more processors 554 and may cause the node 569 to perform the above described methods. The computer program may be provided in a downloadable form or may be stored on a computer program product, for example a disk.

Figure 6:
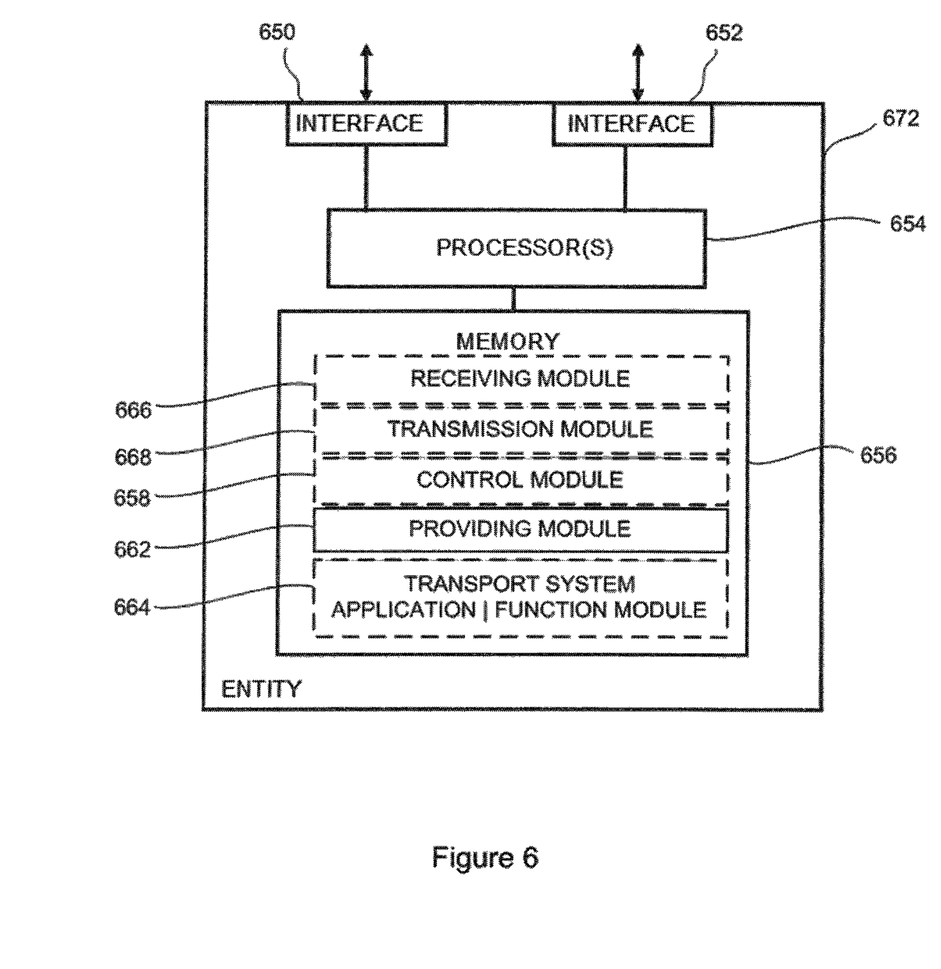
FIG. 6 is a block diagram schematically illustrating an entity usable in association with controlling a V2V communication according to an embodiment of the invention.

FIG. 6 illustrates an exemplary implementation of an entity 672. The entity 672 may correspond to the access node 106a described with reference to FIGS. 1, 3. Alternatively, the entity 672 may correspond to the transport system server 112a described with reference to FIGS. 1, 2 which may optionally be adapted to determine the distribution scheme, as described in FIGS. 1, 2. Further, the entity 672 may correspond to the V2V communication device 116a described with reference to FIGS. 1, 2 or to the V2V communication device 116b described with reference to FIGS. 1 to 3. Further, the entity 692 may also correspond to the sensor 109a, 109b described with reference to FIGS. 1, 2.

The entity 672 is usable in association with controlling V2V communication. The V2V communication is performable using a first radio technology for performing the V2V communication and a second radio technology for accessing the cellular network. The entity 672 is adapted to transmit information impacting a determination of a distribution scheme for distributing a transmission of V2V communication messages among the first radio technology and the second radio technology to a further entity, particularly a V2V communication device adapted to determine the distribution scheme, or a node of the cellular network adapted to determine the distribution scheme. The entity 672 may be also adapted to perform a method as described above.

For example, the entity 672 comprises a first interface 650 for the V2V communication via the first radio technology and/or a second interface 652 which is adapted to operate in accordance with a radio technology for accessing the cellular network and/or for communication with further nodes, for example of a core network, of the cellular network. If the entity 672 may be embodied as a V2V communication device, the first interface 650 may be embodied as a radio interface for V2V communication and the second interface 652 may be embodied as a second radio interface operable in accordance with the second radio technology. If the entity 672 is embodied as an access node, one radio interface may be provided which may operate in accordance with the second radio technology and for communication with further nodes, for example of a core network. If the entity 672 may be embodied as a transport system server, the interface 650 may be embodied as a network interface towards further nodes, for example of the core network, and/or in accordance with the second radio technology. If the entity 672 may be embodied as a sensor, the first radio interface may operate in accordance with the first radio technology and the second interface may be embodied as a radio interface in accordance with the second radio technology. The sensor may comprise only one of the latter interfaces 650, 652. One or more processors 654 of the entity 672 are coupled to the first interface 650 and/or the second interface 652, depending on the embodiment. The one or more processors 654 are further coupled to a memory 656 of the entity 672. The memory 656 may include a Read-Only Memory (ROM), for example a Flash ROM, a Random-Access Memory (RAM), for example a Dynamic RAM (DRAM) or Static RAM (SRAM), a mass storage, for example a hard disk or a solid-state disk, or the like.

The memory 656 includes or stores suitable configured program code to be executed by the one or more processors 654, in order to implement the above-described functionalities of the entity 672. To this end, the program code in the memory 656 may comprise a control module 658 implementing known control functionalities of the entity 672. A providing module 662 of the program code in the memory 656 may implement functionalities for providing information impacting a determination of the distribution scheme. An optional transport system application or function module 664 of the program code in the memory 656 may implement functionalities of a transport system application or function, for example, an ITS application or ITS function, for operating the entity 672 in accordance with a transport system, for example ITS. The program code in the memory 656 may further comprise a receiving module 666 for implementing functionalities for receiving information related to the control of V2V communication. A transmission module 668 of the program code in the memory 656 may implement functionalities for transmitting information related to controlling V2V communication, for example the information impacting the determination of the distribution scheme.

For example, the providing module 662 may implement functionalities related to monitoring the information impacting the determination of the distribution scheme. The providing module 662 may further provide the information, for example, from the transport system application or function to the one or more processors 654 and and/or to the first and/or second interface 650, 652 for further transmission thereof to a V2V communication device adapted to determine the distribution scheme or to the node adapted to determine the distribution scheme. The transport system application or function module 664 may implement functionalities for determining or identifying a priority of V2V communication messages, for example from a vehicle attribute included in the V2V communication messages.

According to another embodiment of the invention, a computer program may be provided. The computer program may comprise or may be embodied in at least one of the above mentioned modules 658-668. The computer program is executable by the one or more processors 654 and may cause the entity 672 to perform the above described methods. The computer program may be provided in a downloadable form or may be stored on a computer program product.

Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation. The description of the invention with reference to 3GPP may not exclude the described invention being applicable in other communication networks and/or technologies, these networks and/or technologies being different from 3GPP.

The invention claimed is:

1. A method for controlling vehicle-to-vehicle (V2V) communication, the method being performed by a V2V communication device and comprising:
    obtaining or determining a distribution scheme for use in selecting, from a set of two or more available radio technologies, a radio technology to employ for the transmission of a V2V message, wherein the set of two or more available radio technologies comprises a first radio technology and a second radio technology, and wherein the distribution scheme specifies a distribution for sending the V2V messages via the set of two or more available radio technologies;
    for at least a first V2V message, using the distribution scheme to select a radio technology from the set of two or more available radio technologies for use in transmitting the first V2V message; and
    transmitting the first V2V message using the selected radio technology.

2. The method of claim 1, wherein the distribution scheme specifies a transmission rate in accordance with which V2V communication messages are to be transmitted via the first technology and/or second radio technology.

3. The method of claim 1, wherein
    the first radio technology is an ad-hoc radio technology, and
    the second radio technology is a cellular radio technology.

4. The method of claim 1, wherein the distribution scheme specifies that, for each message transmitted using the first radio technology, at least X number of V2V message must be transmitted using the second radio technology, wherein X is a whole number greater than 0.

5. The method of claim 1, wherein the distribution scheme specifies that a V2V communication message having a certain priority is to be transmitted via the second radio technology, wherein a V2V communication message having a priority different from the certain priority is to be transmitted via the first radio technology.

6. The method of claim 1, wherein the distribution scheme is determined based on at least one of:
    information relating to a density of certain entities in a certain coverage area of the second radio technology at a given time,
    information relating to an average connectivity via the first radio technology in a certain coverage area of the second radio technology at a given time,
    information relating to an available transmission capacity to be usable for V2V communication via the second radio technology in a certain coverage area of the second radio technology at a given time,
    information relating to a priority and/or a type of a V2V communication message to be transmitted, or
    information relating to a required transmission area in which a V2V communication message is to be transmitted.

7. A computer program product comprising a non-transitory computer readable medium storing computer instructions which, when executed by one or more processors of a vehicle-to-vehicle (V2V) communication device, cause the V2V communication device to perform the method of claim 1.

8. A vehicle-to-vehicle (V2V) communication device for controlling V2V communication, the V2V communication device comprising:
    a memory; and
    processing circuitry coupled to the memory, wherein the V2V communication device is configured to:
    obtain or determine a distribution scheme for use in selecting, from a set of two or more available radio technologies, a radio technology to employ for the transmission of a V2V message, wherein the set of two or more available radio technologies comprises a first radio technology and a second radio technology, and wherein the distribution scheme specifies a distribution for sending the V2V messages via the set of two or more available radio technologies;
    use the distribution scheme to select a radio technology from the set of two or more available radio technologies for use in transmitting at least a first V2V message; and
    employ a transmitter to transmit the first V2V message using the selected radio technology.

9. A vehicle comprising a V2V communication device according to claim 8.

10. The V2V communication device of claim 8, wherein the V2V communication device is configured to obtain the distribution scheme from a message that is transmitted by a base station of a radio access network.

11. The V2V communication device of claim 8, wherein the V2V communication device is configured to obtain the distribution scheme from a message that is broadcast by the base station to all V2V communication devices located in a serving area of the base station.

12. The V2V communication device of claim 8, wherein the V2V communication device is configured to obtain the distribution scheme from a handover command that is transmitted to the V2V communication device when the V2V communication device enters a coverage area of the base station.

13. The V2V communication device of claim 8, wherein the V2V communication device is configured to determine the distribution scheme.

14. The V2V communication device of claim 8, wherein the V2V communication device is further configured to employ a transmitter to transmit the distribution scheme to a second V2V communication device.

15. A method for controlling vehicle-to-vehicle (V2V) communications, the method being performed by a node of a cellular network and comprising:
   determining a distribution scheme for use in selecting, from a set of two or more available radio technologies, a radio technology to employ for the transmission of V2V messages, wherein the set of two or more available radio technologies comprises a first radio technology and a second radio technology, and wherein the distribution scheme specifies a distribution for sending the V2V messages via the set of two or more available radio technologies; and
   transmitting to a V2V communication device information identifying the determined distribution scheme.

16. The method of claim 15, wherein the determined distribution scheme specifies a transmission rate in accordance with which V2V communication messages are to be transmitted via the first technology and/or second radio technology.

17. The method of claim 15, wherein the determined distribution scheme specifies that, for each message transmitted using the first radio technology, at least X number of V2V message must be transmitted using the second radio technology, wherein X is a whole number greater than 0.

18. The method of claim 15, wherein the determined distribution scheme specifies that a V2V communication message having a certain priority is to be transmitted via the second radio technology, wherein a V2V communication message having a priority different from the certain priority is to be transmitted via the first radio technology.

19. The method of claim 15, wherein the distribution scheme is determined based on at least one of:
   information relating to a density of certain entities in a certain coverage area of the second radio technology at a given time,
   information relating to an average connectivity via the first radio technology in a certain coverage area of the second radio technology at a given time,
   information relating to an available transmission capacity to be usable for V2V communication via the second radio technology in a certain coverage area of the second radio technology at a given time,
   information relating to a priority and/or a type of a V2V communication message to be transmitted, or
   information relating to a required transmission area in which a V2V communication message is to be transmitted.

20. A computer program product comprising a non-transitory computer readable medium storing computer instructions which, when executed by one or more processors of a node of a cellular network, cause the node to perform the method of claim 15.

21. A node of a cellular network for controlling V2V communication, the node comprising:
   a memory; and
   processing circuitry coupled to the memory, wherein the node is configured to:
   determine a distribution scheme for use in selecting, from a set of two or more available radio technologies, a radio technology to employ for the transmission of V2V messages, wherein the set of two or more available radio technologies comprises a first radio technology and a second radio technology, and wherein the distribution scheme specifies a distribution for sending the V2V messages via the set of two or more available radio technologies; and
   transmit to a V2V communication device information identifying the determined distribution scheme.

22. The node of claim 21, wherein
   the first radio technology is an ad-hoc radio technology, and
   the second radio technology is a cellular radio technology.

23. The node of claim 21, wherein the node is a base station of a radio access network.

24. The node of claim 23, wherein the node is configured to transmit the information identifying the determined distribution scheme by broadcasting the information to all V2V communication devices located in a serving area of the base station.

25. The node of claim 21, wherein the node is configured to transmit the information identifying the determined distribution scheme by transmitting to the V2V communication device a handover message that comprises the information.

26. The node of claim 21, wherein the node is further configured to transmit to a second V2V communication device the information identifying the determined distribution scheme.

27. The method of claim 1, wherein the distribution scheme is determined based on at least one of:
   information relating to a density of certain entities in a certain coverage area of the second radio technology at a given time,
   information relating to an average connectivity via the first radio technology in a certain coverage area of the second radio technology at a given time,
   information relating to an available transmission capacity to be usable for V2V communication via the second radio technology in a certain coverage area of the second radio technology at a given time, or
   information relating to a required transmission area in which a V2V communication message is to be transmitted.

* * * * *

UNITED STATES PATENT AND TRADEMARK OFFICE
CERTIFICATE OF CORRECTION

PATENT NO. : 10,681,765 B2
APPLICATION NO. : 15/967989
DATED : June 9, 2020
INVENTOR(S) : Brahmi et al.

It is certified that error appears in the above-identified patent and that said Letters Patent is hereby corrected as shown below:

In the Specification

In Column 1, Line 10, delete "US 20160242223)," and insert -- US 2016/0242223), now Pat. No. 9,992,089, --, therefor.

In Column 4, Lines 36-38, delete "Universal Terrestrial Mobile Telecommunication System (UMTS) or Wideband Code Division Multiple Access (CDAM)," and insert -- Universal Mobile Telecommunication System (UMTS) or Wideband Code Division Multiple Access (WCDMA), --, therefor.

In Column 4, Lines 38-39, delete "Service Architecture Evolution (SAE)/LTE," and insert -- System Architecture Evolution (SAE)/LTE, --, therefor.

In Column 8, Line 39, delete "in in the" and insert -- in the --, therefor.

In Column 21, Line 10, delete "and and/or" and insert -- and/or --, therefor.

Signed and Sealed this
First Day of September, 2020

Andrei Iancu
*Director of the United States Patent and Trademark Office*